May 22, 1928.

J. BOENIG

FRUIT PICKER

Filed March 22, 1927

1,670,796

Inventor
Joseph Boenig
by Jacobi & Jacobi
Attorney

Patented May 22, 1928.

1,670,796

UNITED STATES PATENT OFFICE.

JOSEPH BOENIG, OF DECATUR, ILLINOIS.

FRUIT PICKER.

Application filed March 22, 1927. Serial No. 177,344.

This invention relates to fruit pickers and consists in the novel features hereinafter described and claimed.

An object of the invention is to provide a fruit picker for gathering fruit from the branches of the trees means for severing the stems in order that the fruit may be detached without injury or bruising the same.

A further object of the invention is to provide in conjunction with the stem cutting means a bag or receptacle for receiving the fruit after the stems have been cut.

A further object of the invention is to provide a fruit picker of the character stated which may be used by an operator standing upon the ground or upon the ladder or who is standing upon the branches of a tree, and by using the picker may gather the fruit which is located at the ends of the branches without having to bend the branches of the tree, thus avoiding the possibility of breaking and injuring the tree.

With these objects in view, the structure includes an annular body preferably formed of sheet metal and having a handle staff attached thereto. This body is provided at one edge with constricted channels having circular openings at their inner ends. Guiding lugs are mounted upon the exterior of the body member and arcuate blades are slidably mounted between the lugs and are disposed against the exterior surface of the body member. The blades are provided at points along their edges with circular notches which in turn are provided with sharpened edges. Springs are connected with the blade sections and the body and serve to normally hold the circular notches of the blades in register with the circular openings of the body. A pull cord is connected with the blade sections and extends along the handle staff and may be used for drawing the cutting edges of the blade sections across the openings of the body member so that the stems of the fruit are severed when they are received in the said openings and in the notches of the blade sections. A bag is detachably connected with the body member and is adapted to receive the fruit when the stems are cut.

In the accompanying drawing:—

Figure 1:
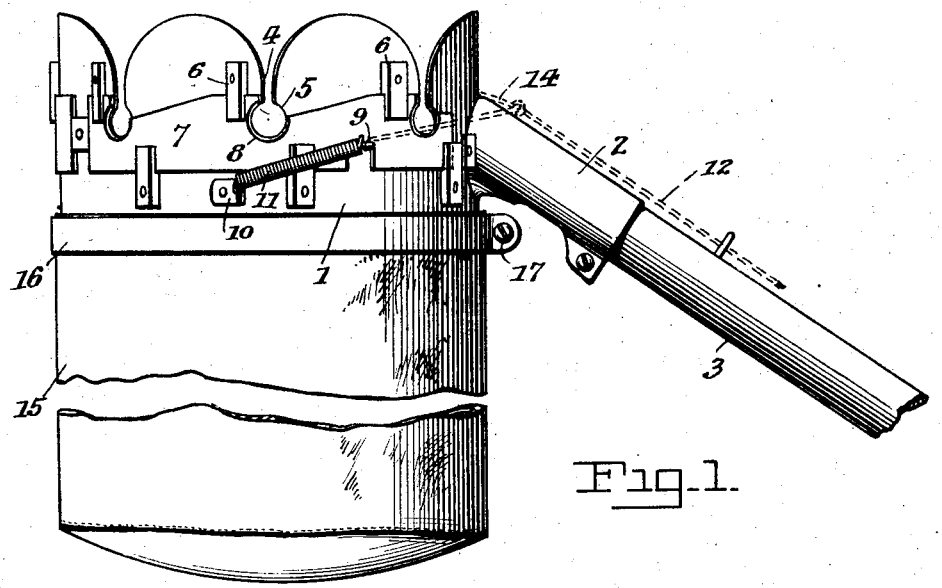
Figure 1 is a side elevational view of the fruit picker.
Figure 2:
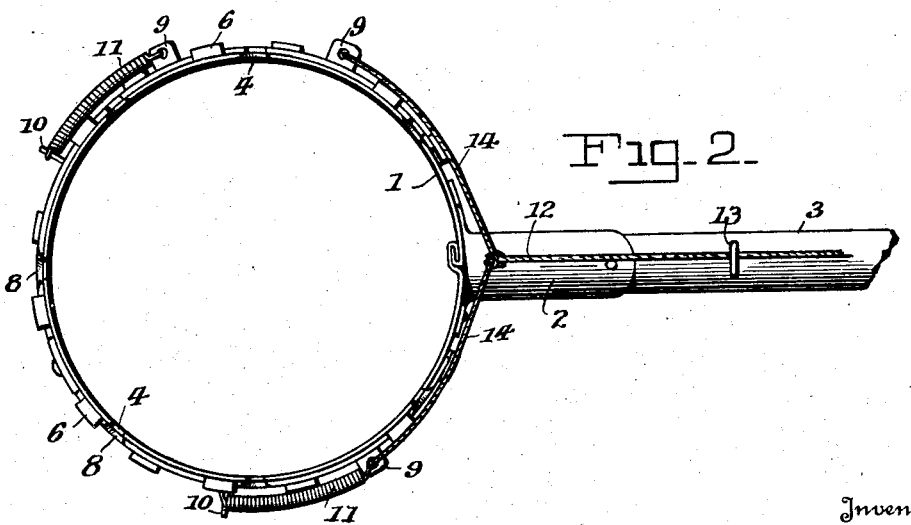
Figure 2 is an edge elevational view thereof.
Figure 3:
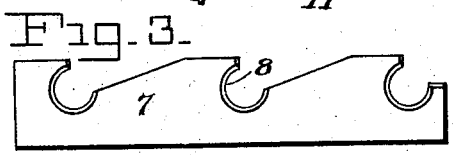
Figure 3 is a side elevational view of one of the blade sections.

The fruit picker includes an annular body member 1, preferably formed of sheet metal, and provided at one side with an angularly disposed socket 2 which receives the end portion of a handle staff 3. The body member 1 is provided at one edge with constricted channels 4 having at their inner ends circular openings 5.

Spaced guide lugs 6 are located upon the exterior surface of the body member 1. Arcuate blade sections 7 are applied to the exterior surface of the body member 1, and are slidably mounted between the guide lugs 6. Said blade sections are provided with arcuate cutting edges 8 adapted to register with the openings 5 of the body member, as best shown in Figure 1 of the drawing. The blade sections 7 are provided with outstanding lugs 9 and lugs 10 are mounted upon the body member 1. Coiled springs 11 are connected at one end with the lugs 10 and at their other end with lugs 9. The said springs 11 are under tension and with a tendency to hold the arcuate cutting edges 8 to register with the edges of the openings 5. A pull cord 12 is threaded through an eye 13 mounted upon the staff and is provided at one end with branches 14 which are connected with the lugs 9 of the blade sections 7. A bag 15 is clamped upon the exterior surface of the body member 1 by means of a band 16, and the ends of the band are drawn toward each other by a bolt or screw 17 whereby the bag 15 is securely held with relation to the body member.

In use, the staff 3 is taken in the hand of the operator and the body member is moved toward the fruit so that the stem of the fruit is passed through one of the constricted channels 4 and is located in one of the openings 5. The operator then exerts a pull upon the cord 12 whereby the adjacent ends of the blade sections 7 are drawn toward each other and against the tension of the springs 11 and the cutting edges 8 are caused to move across the openings 5. Thus the stem of the fruit is cut and the fruit is severed from the tree. The fruit falls through the body member 1 and enters the bag 15. This action may be repeated until the bag 15 is filled with the gathered fruit.

When the pulling strain is removed from the cord 12, the springs will return the blade sections 7 under the guides so that the cutting edges 8 are brought into register with the circular openings 5 in the body member.

The improved device is simple in structure, may be easily and quickly applied and operated, and protects the tree from damage to the limbs while picking the fruit and the device may be made in any suitable size and of any suitable capacity and suitable material.

From the foregoing description of the construction of my improved device, it will be seen that I have provided a simple, inexpensive and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described my invention, what I claim is:

A fruit picker comprising an annular body having at its edge channels provided with constricted edge walls and which terminate at their inner ends in enlarged circular openings, the centers of said openings being in radial alinement with the center of the body an arcuate blade mounted for sliding movement upon the body and having openings leading in from its edge, said openings being provided with arcuate cutting edges adapted to register with the edges of the enlarged openings in the body.

In testimony whereof I affix my signature.

JOSEPH BOENIG.